July 17, 1951　　　S. D. BOGGS, JR., ET AL　　2,560,625
VEHICLE BODY LIFT AND HITCH
Filed Aug. 14, 1948　　　　　　　　　　　2 Sheets—Sheet 1
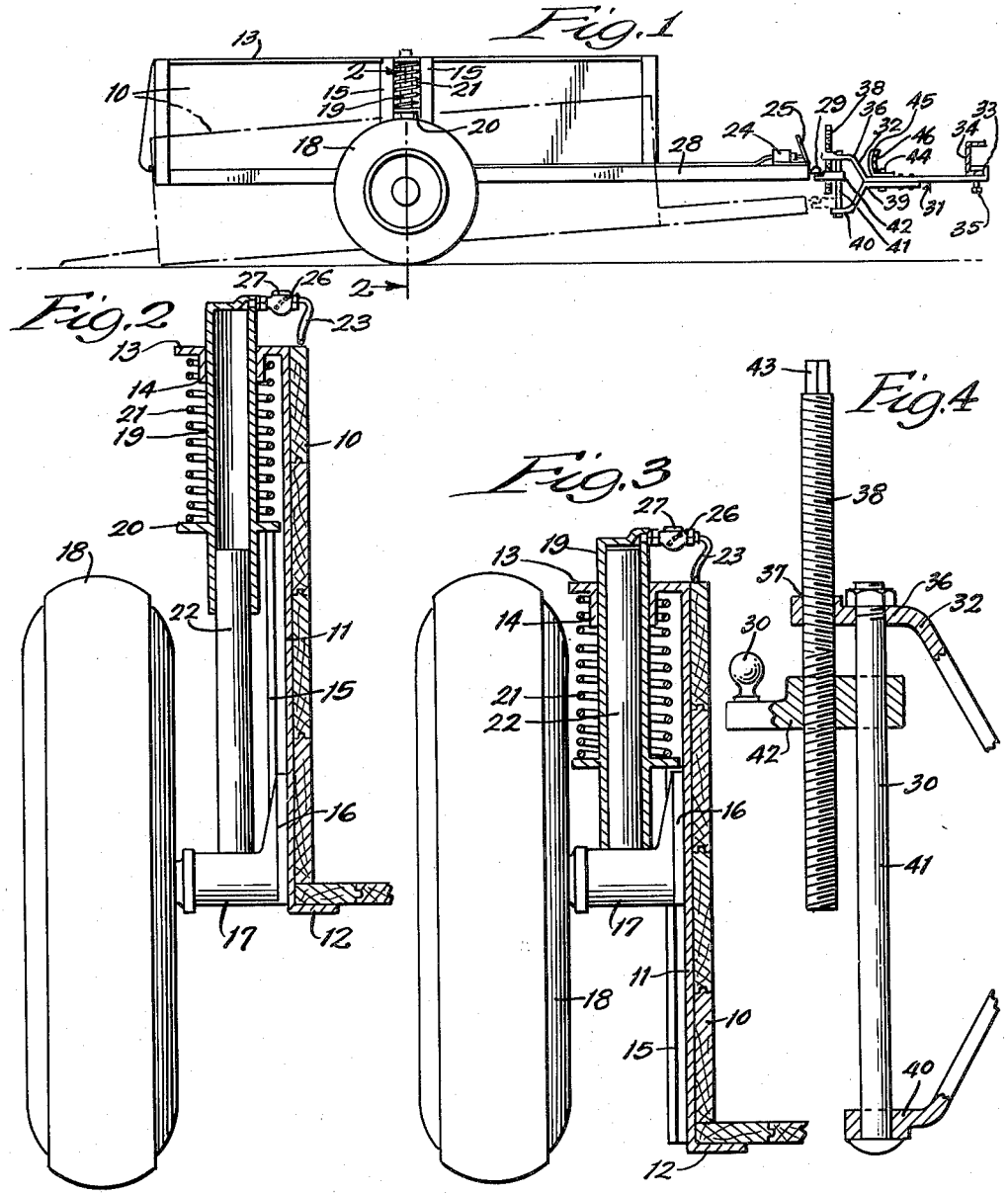
Inventors:
Samuel D. Boggs Jr.
and Ralph R. Handelman,
By Davson, Orme, Bratton & Spangenberg,
Attorneys.

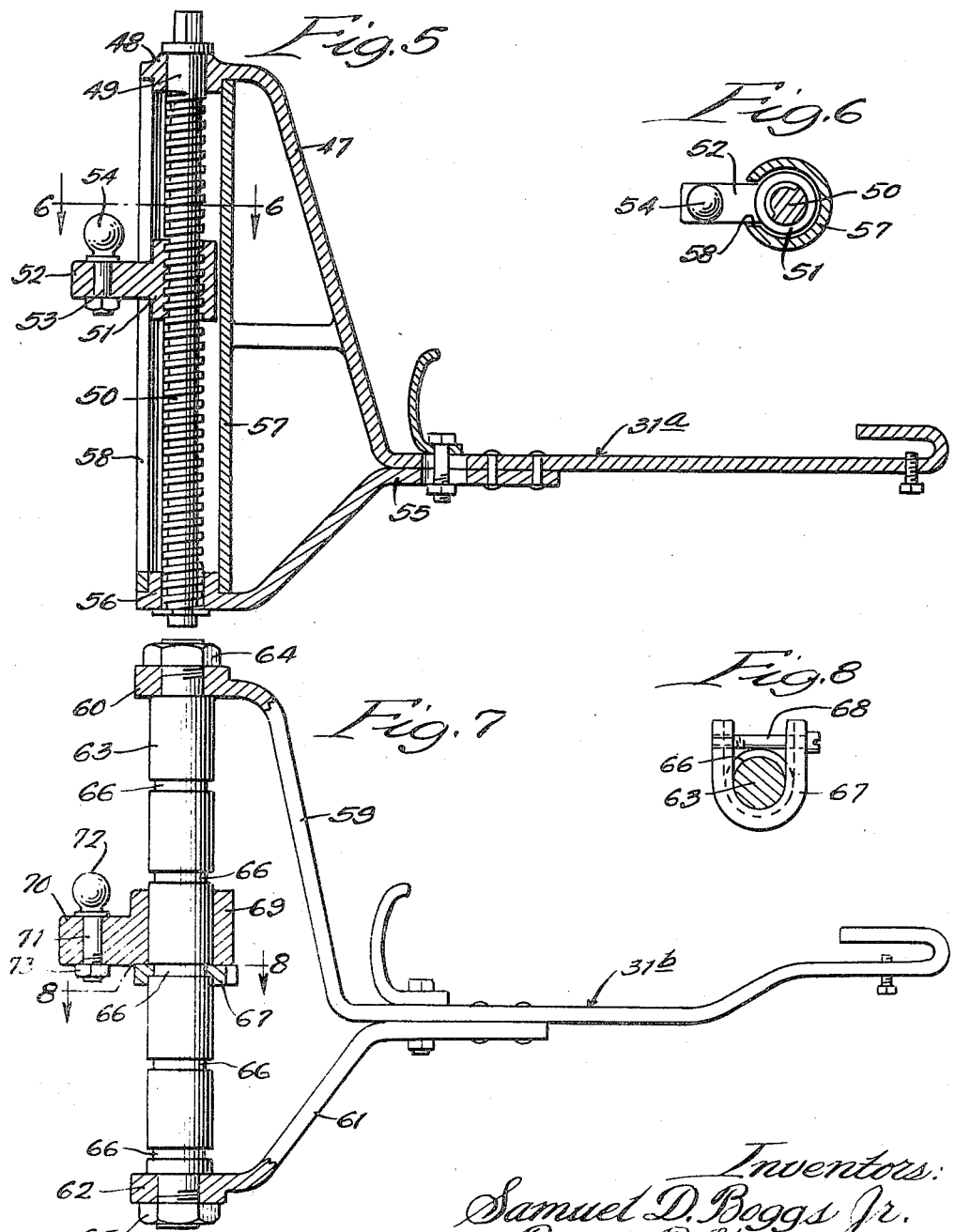

Patented July 17, 1951

2,560,625

UNITED STATES PATENT OFFICE 2,560,625

VEHICLE BODY LIFT AND HITCH

Samuel D. Boggs, Jr., Clarendon Hills, and Ralph R. Handelman, Chicago, Ill., assignors, by mesne assignments, to Alvin J. Parcelle, Chicago, Ill.

Application August 14, 1948, Serial No. 44,376

3 Claims. (Cl. 280—44)

This invention relates to a vehicle body lift and hitch. The invention is particularly useful in connection with a trailer structure, the floor or body of which is vertically adjustable with respect to the wheel axles, and the hitch connections with the vehicle ahead are also vertically adjustable for alignment with the vertically-adjusted trailer body.

An object of the invention is to provide a trailer or other vehicle equipped with vertically-adjustable wheels guided upon the vehicle, together with fluid pressure means for shifting the wheels relative to the body, the body being suspended upon springs with respect to the wheel axles irrespective of the position of the wheels relative to the body. Another object is to provide a vehicle structure equipped with vertically-adjustable wheels, with springs interposed between the wheels and the body and the vehicle being connected to another vehicle by means of a novel hitch structure provided with vertically-adjustable connection means. A still further object is to provide a hitch structure for connecting a trailer having a vertically-adjustable body with an automobile, the hitch structure being equipped with means for connection with a frame member of the automobile and the bumper thereof, while providing sturdy connection means for vertically adjusting the connection between the drawn vehicle to the drawing vehicle. Other specific objects and advantages will appear as the specification proceeds.

The invention is illustrated, in preferred embodiments, by the accompanying drawings, in which—

Figure 1 is a side view in elevation of apparatus embodying our invention; Fig. 2, an enlarged vertical sectional view, the section being taken as indicated at line 2—2 of Fig. 1 and the body being shown in elevated position with respect to the wheels; Fig. 3, a view similar to Fig. 2 but showing the body in lowered position relative to the wheels; Fig. 4, a broken enlarged sectional view of a portion of the hitch structure; Fig. 5, a sectional view similar to Fig. 4 but showing a modified form of hitch structure; Fig. 6, a transverse sectional detail view, the section being taken as indicated at line 6—6 of Fig. 5; Fig. 7, a broken side view in elevation of a modified form of hitch structure, some of the parts being shown in section; and Fig. 8, a transverse sectional view, the section being taken as indicated at line 8—8 of Fig. 7.

In the illustration given in Figs. 1 to 4 inclusive, 10 designates the body of a trailer or vehicle. It will be understood that the body may be formed of wood, metal, or any other suitable material. In the illustration given, the trailer or vehicle is equipped with bottom and side walls, and on either side of the vehicle a metal track member 11 is provided. The member 11 comprises a plate fitting against the side wall of the vehicle and having at its bottom an inwardly-turned flange 12 secured to the bottom wall of the vehicle body 10. The plate is also provided at its top with an outwardly-extending flange 13 having a downwardly-turned collar 14, as shown more clearly in Figs. 2 and 3. Extending over the plate 11 and on either side thereof is a guide plate 15 spaced from the plate or track member 11 and providing between it and the plate a guide slot adapted to receive the side flanges 16 of a wheel axle 17. The axle 17 is provided with wide flanges, as illustrated, which extend laterally into the guide recesses between the plates 15 and the inner guide plate 11. Thus the axle 17 is rigidly guided for vertical movement with respect to the body 10. Upon each of the axles 17 is mounted a wheel 18.

Extending through each of the collars 14 is a floating cylinder 19 equipped near its lower end with a flange 20. A coil spring 21 is interposed between the flange 20 and the flange 13 of the plate 11.

Snugly received within the cylinder 19 is a piston 22 having its lower end welded or otherwise secured to the axle 17.

Pressure fluid, such as oil or other hydraulic liquid, is supplied to the top of the cylinder through the tube 23. The tube 23 leads to a small pump 24 actuated by a manual lever 25. Since the hydraulic mechanism is of well-known construction, a detailed description is believed to be unnecessary.

We prefer to equip the conduit 23 adjacent the cylinder 19 with a check valve 26 permitting the flow of hydraulic fluid into the cylinder but preventing the escape of fluid from the cylinder. The manual release element 27 is provided to permit the release of fluid from the cylinder. Since such check valves are of well-known construction, a detailed description is believed to be here unnecessary.

The vehicle is provided with an extension 28 upon which the pump 24 may be conveniently mounted, and at its forward end is provided with a socket connection 29 adapted to receive a ball 30 carried by the hitch structure 31.

The hitch structure 31 comprises an upper bar 32 which extends rearwardly and is equipped with a U-shaped end portion 33 adapted to engage an angle beam 34 with which the body of the vehicle ahead is provided. The beam 34 is a standard part of an automobile frame and is adapted to be engaged by the end portion of the member 32. A set screw 35 may be provided for securing the end to the beam 34.

At its forward end, the member 32 is provided with an upwardly-extending arm 36 equipped with a nut 37 for receiving an actuating screw 38.

A second bar 39 is secured to the bar 32 and has a downwardly-extending arm 40 spaced from said arm 36. A guide rod 41 extends through the lower arm 40 of the member 39 and through the arm 36 of the upper bar 32, as shown more clearly in Fig. 4. Slidably mounted upon the guide rod 41 is a connector member 42. The connector member 42 is apertured to receive the guide rod 41 and also provided with a threaded opening for receiving the screw 38. The forward end of the connector member 42 is extended and the extension is equipped with a ball 30 adapted to be received within the socket member 29 carried by the trailer extension 28.

The screw 38 is preferably provided with a square end 43 adapted to receive a wrench for the turning of the screw. Preferably, the upper portion of the screw is equipped with lefthand threads while the lower portion of the screw is equipped with righthand threads whereby upon the rotating of the screw an extremely rapid movement of the connector element 42 is effected.

The upper and lower bars 32 and 39 are preferably provided with a slot adapted to receive a bolt 44 extending through the bracket arm 45, as shown more clearly in Fig. 1. The bracket arm 45 has preferably a curved upper portion adapted to receive the bumper 46 of the automobile. Thus, by having the forward end 33 of the hitch member 31 engaging the frame beam 34 of the forward vehicle and by having the adjustable bracket 45 engaging the bumper 46 of the vehicle, an extremely sturdy connection is made. The resiliently-supported bumper 46, which is engaged by the clamp of bracket 45, provides a tight and solid connection with the drawing vehicle. The member 45 is advanced until it tightly engages the bumper 46, and the bolt 44 is then tightly drawn to secure the bracket 45 in the adjusted position.

*Operation*

In the operation of the structure shown in Figs. 1 to 4 inclusive, the pump 24 is effective, upon operation of the manual lever 25, to pump hydraulic fluid into the cylinder 19 and thereby to raise the body with respect to the wheel axle 17, the body being shown in elevated position in Fig. 2. To lower the body with respect to the axle 17, the fluid is released as in the usual hydraulic mechanisms. If the check valve structure 26 is employed, any breakage in the hydraulic line will not result in the dropping of the vehicle body by reason of the check valve closing off the exhaust line 23. On the other hand, the manual release 27 can be actuated to release pressure fluid from the cylinders as desired.

In any position of the wheels with respect to the body, the springs 21 are effective for cushioning the body with respect to movement of the axle 17. Whether the piston be in the extended position shown in Fig. 2 or in the collapsed position shown in Fig. 3, the springs are still effective for suspending the body resiliently upon the wheel axle structure.

It will also be observed that the wheel axles 17 are independently supported upon the body structure 10 and are guided for individual movement upon the body. By providing the guide structure illustrated, it is possible to employ a single piston 22 for each axle and to utilize a floating cylinder thereabove. The structure occupies very little space and is compactly supported immediately above each wheel axle.

The ball and socket connections provided between the forward end of the trailer and the rear end of the tractor permit angular movement of the trailer extension 28 with respect to the drawing vehicle. The hitch structure also permits rapid adjustment of a connector element 42 so that the line of tractive force is effective in the plane of the tractor extension 28.

The stress or strain passing through the connector element 42 is absorbed by the heavy guide rod 41, thus relieving the actuating screw 38 substantially of strain. The screw 38 may be rotated in either direction to effect vertical movement of the connector element 42, and such movement is rapid by reason of the screw 38 having both lefthand and righthand threaded portions.

To couple the hitch 31 with the tractor vehicle, the U-shaped member 33 at the forward end of the member 31 is brought into engagement with the lower flange of the frame beam 34 of the vehicle, while the bracket 45 is brought into tight engagement with the bumper 46. Bolt 44 is then tightened so that the hitch member 31 is firmly held between the beam 34 and the bumper structure 46.

In the modification illustrated in Fig. 5, the hitch member 31ª is provided with a bar having an upwardly-extending arm 47 provided with an apertured end ring 48 receiving the non-threaded portion 49 of a screw 50. The screw 50 threadedly engages a nut 51 equipped with an extension 52 apertured to receive a bolt 53 carrying a ball 54. By employing the removable bolt 53, balls 54 of varying sizes may be employed as desired to fit the sockets of different trailers. A second bar 55 is provided with a downwardly-extending arm supporting an apertured plate 56 supporting the lower end of the screw 50.

Between the members 48 and 56 is supported a cylinder 57 having a vertical slot 58 at its forward end.

In the operation of the structure shown in Fig. 5, the screw 50 is rotated to raise or lower the structure 51 and the ball 54 carried thereby. The slotted cylinder 57 maintains the element 51 in a true vertical path.

In the structure illustrated in Figs. 7 and 8, the hitch 31ᵇ is provided with an upwardly-extending arm 59 having an apertured head 60 and with a lower arm 61 having an apertured head 62. The shaft 63 has reduced end portions extending through the members 60 and 62, and the reduced portions are threaded to engage the nuts 64 and 65.

The shaft 63 is provided at spaced intervals with annular recesses 66 adapted to be engaged by the locking collar 67. The collar 67, as shown more clearly in Fig. 8, is U-shaped and has its arm extensions apertured to receive the screw 68. Upon the removal of the screw 68, the U-shaped member 67 can be caused to engage any of the annular recesses 66 so as to support the connector element 69 thereabove. The connector element 69 is apertured to receive the shaft 63 and is slidable thereon. Upon the attachment of the locking collar 67 therebelow, the element 69 is held at this position. The element 69 is provided with an extension 70 apertured to receive a bolt 71, the bolt being provided at its top end with a ball 72 and at its bottom end with a threaded portion adapted to receive a nut 73. In other respects, the structure shown in Figs. 7 and 8 is similar to the structure shown in Figs. 1 to 4 and in Figs. 5 and 6.

Instead of using the lifting screw 38 or 50, a hydraulic cylinder with a lifting plunger may be employed for raising the member 42 or 52. It will be understood that other structures may be employed for raising and lowering the members 42 or 52.

While in the foregoing specification, we have shown portions of the structure in considerable detail for the purpose of illustrating embodiments of the invention, it will be understood that such details of structure may be varied widely by those skilled in the art without departing from the spirit of our invention.

We claim:

1. A vertically-adjustable vehicle body comprising a frame, a vertically mounted track on each side of said frame, an axle for each track, each of said axles carrying a wheel and being slidably supported in one of said tracks, a pair of piston members respectively mounted on the top of the axles in generally vertical positions, a cylinder for each piston adapted to fit in snugly slidable relationship therewith, each of said cylinders having a closed upper end, a flange on the outer surface of each cylinder, support means mounted on each side of the vehicle adapted to slidably receive the upper end of one of the cylinders and to provide therearound a spring seat, spring means mounted between the spring seat and the flange on each side of the vehicle, said spring means being adapted to support the weight of the vehicle body without being fully compressed, and means for introducing hydraulic fluid into each of the cylinders above the piston for raising the cylinders relative to the pistons.

2. Apparatus according to claim 1 wherein the spring means comprise a pair of coiled springs, one of said springs being concentrically arranged relative to each of said cylinders.

3. Apparatus according to claim 1 wherein a manually actuatable check valve is provided for each of the cylinders operative to prevent the escape of hydraulic fluid from the cylinders except on manual actuation.

SAMUEL D. BOGGS, Jr.
RALPH R. HANDELMAN.

REFERENCES CITED

The following references are of record in the file of this patent:

UNITED STATES PATENTS

| Number | Name | Date |
|---|---|---|
| 1,403,687 | Hillstrom | Jan. 17, 1922 |
| 1,941,143 | Wickersham | Dec. 26, 1933 |
| 2,002,605 | Kincaid, Jr. | May 28, 1935 |
| 2,045,524 | Fehrmann | June 23, 1936 |
| 2,116,825 | Crescent, et al. | May 10, 1938 |
| 2,155,521 | Zavarella | Apr. 25, 1939 |
| 2,196,338 | McDaniel | Apr. 9, 1940 |
| 2,262,288 | Klipstein | Nov. 11, 1941 |
| 2,408,254 | Du Pont | Sept. 24, 1946 |
| 2,415,026 | Brown | Jan. 28, 1947 |
| 2,452,110 | Dourte | Oct. 26, 1948 |